United States Patent

Smith

[15] 3,680,520
[45] Aug. 1, 1972

[54] APPARATUS FOR CONTROLLING DEPTH OF A WATER-TOWED CABLE

[72] Inventor: Bill Smith, Ponca City, Okla.
[73] Assignee: Continental Oil Company, Ponca City, Okla.
[22] Filed: Sept. 25, 1970
[21] Appl. No.: 75,387

[52] U.S. Cl. .............................. 114/235 B, 340/7 PC
[51] Int. Cl. ............................................. B63b 21/00
[58] Field of Search ................... 114/235 B; 340/7 PC

[56] References Cited

UNITED STATES PATENTS 3,541,989   11/1970   Leonard ..................... 114/235 B
3,375,800    4/1968   Cole et al. ................. 114/235 B

*Primary Examiner*—Trygve M. Blix
*Attorney*—Joseph C. Kotarski, Henry H. Huth, Robert B. Coleman, Jr., William J. Miller and David H. Hill

[57] ABSTRACT

Apparatus for controlling the depth of water-towed cables such as marine seismic cables, such apparatus being remotely controllable to run at a predetermined depth under regulation of hydrostatic pressure responsive mechanism. The apparatus consists of electrical transmission and reception circuitry operating in conjunction with the seismic cable, and being capable of controlling depth regulating mechanism to operate at one of a plurality of selected depths. The depth regulating mechanism includes first and second coacting pressure regulator devices, the first regulator device being a regulatory mechanism for varying the diving planes in accordance with the differential between the ambient hydrostatic pressure and a pre-set volume of gas under selected pressure, the second device functioning as a servo-follower mechanism to select and control the amount of gas pressure within said pre-set volume at the specified depth.

2 Claims, 10 Drawing Figures

INVENTOR
BILL SMITH

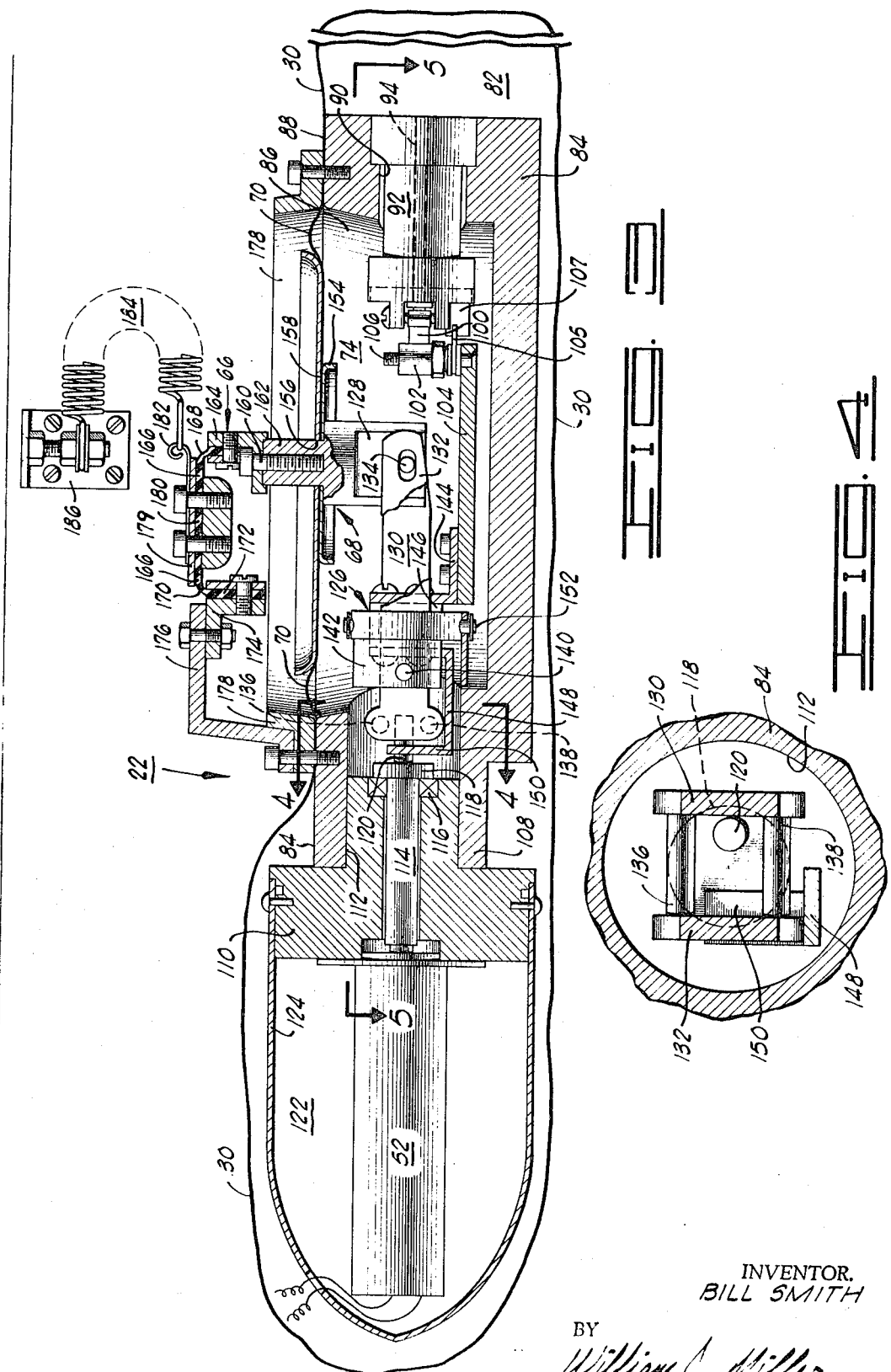

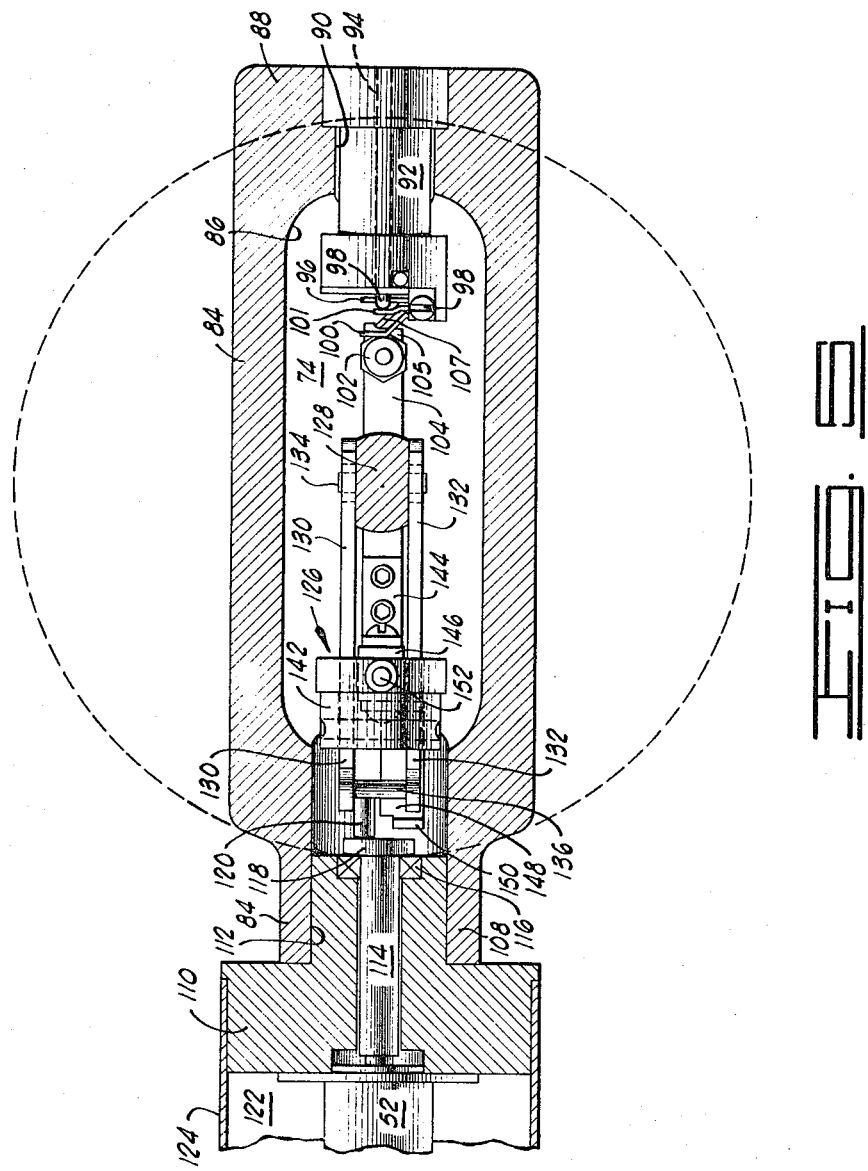

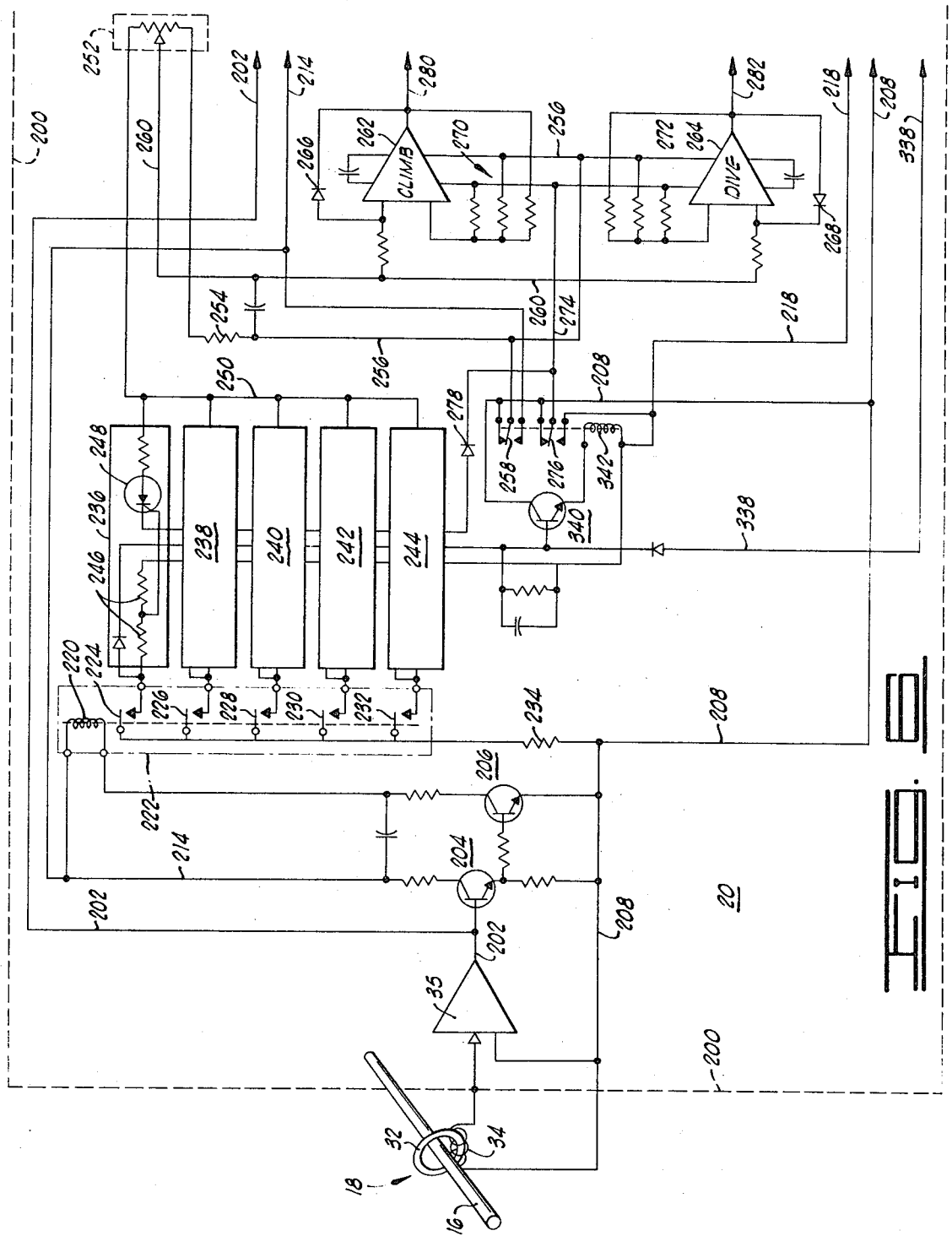

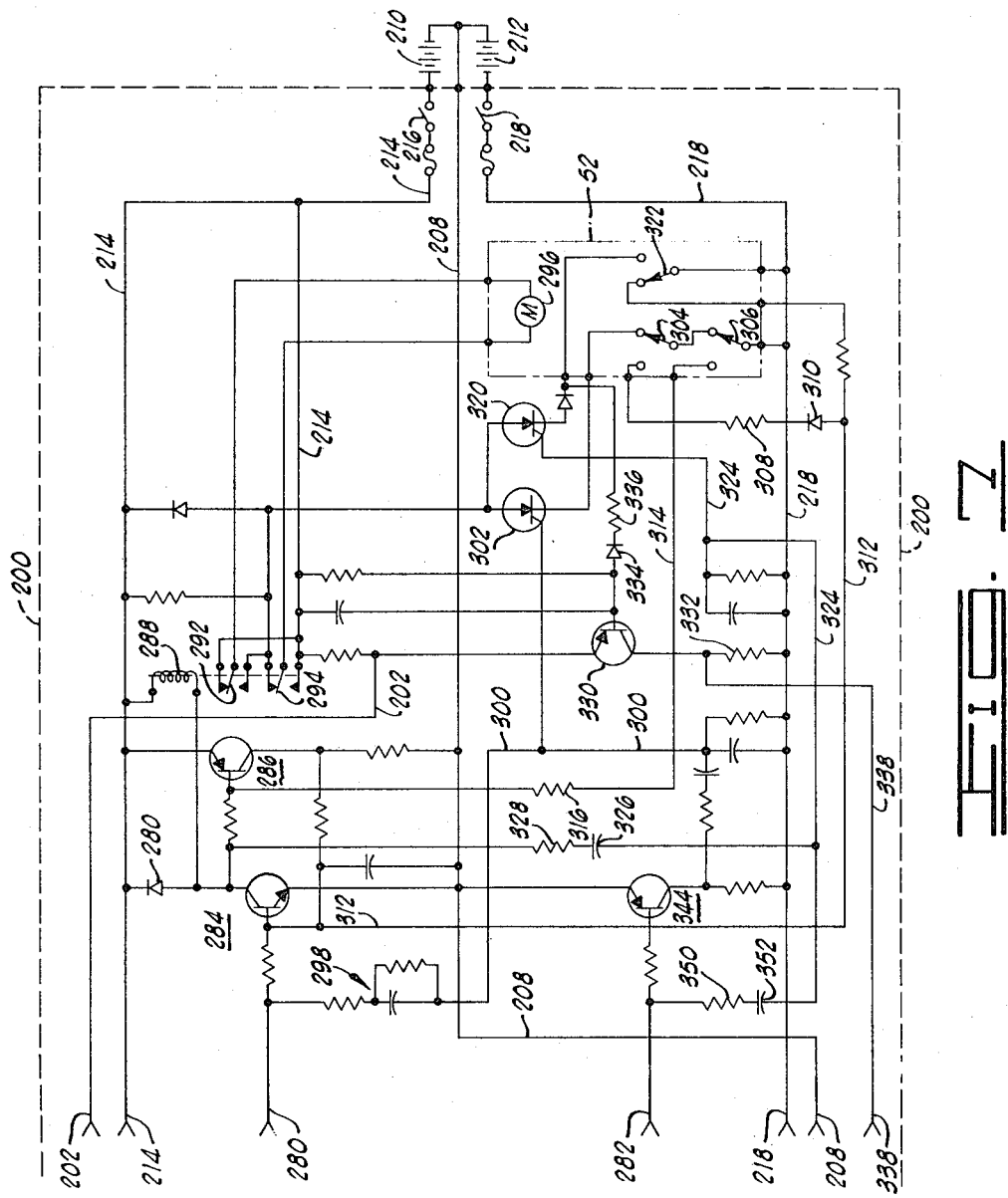

INVENTOR.
BILL SMITH
BY
William C. Miller
ATTORNEY

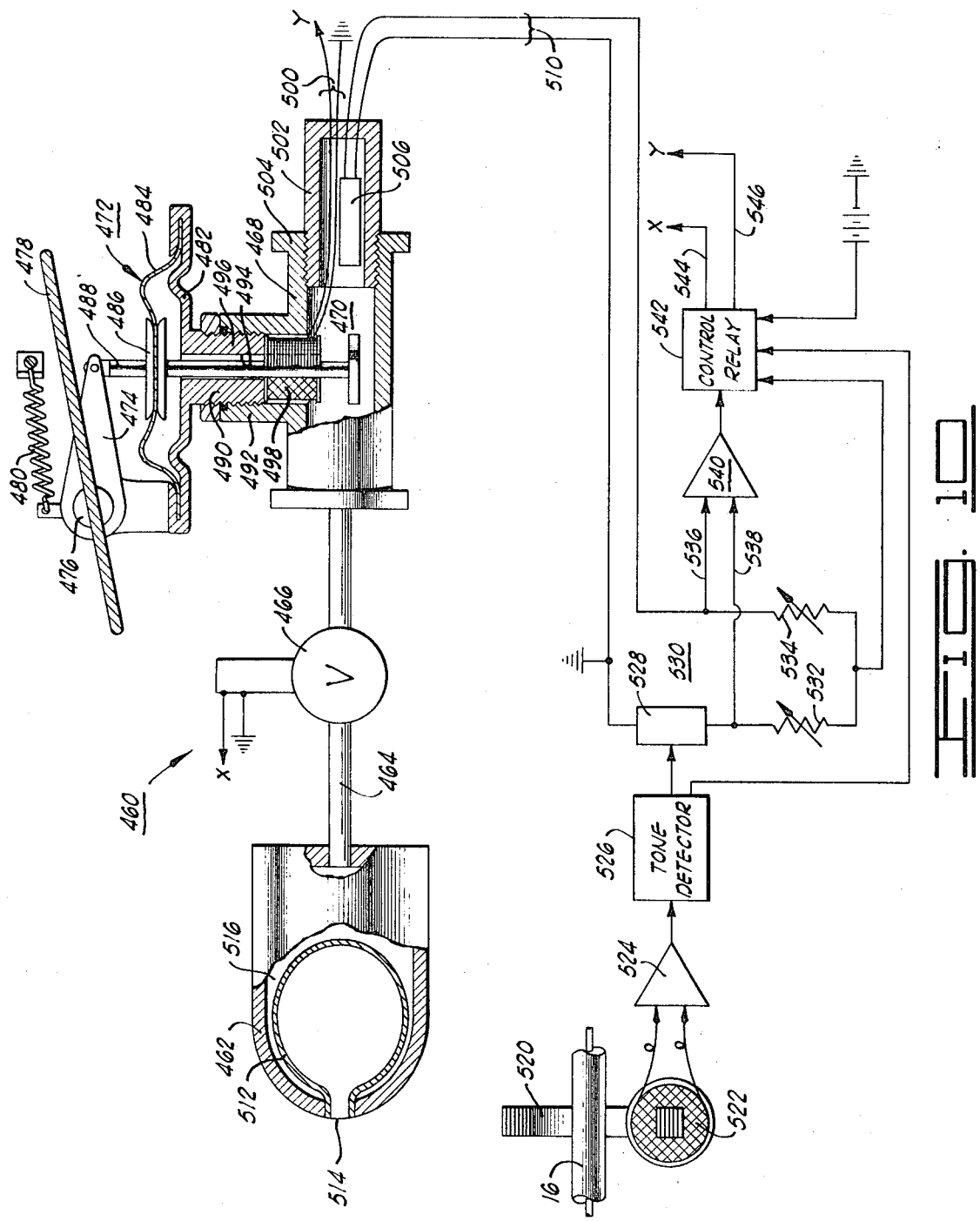

APPARATUS FOR CONTROLLING DEPTH OF A WATER-TOWED CABLE

BACKGROUND OF THE INVENTION

1. Field of the Invention

The invention relates generally to depth control mechanisms for use with marine seismic cables and the like and, more particularly, but not by way of limitation, it relates to improvements in remote-controlled depth keeping apparatus for use with marine seismic cable apparatus.

2. Description of the Prior Art

The prior art includes various types of paravane instrument as utilized with marine seismic cable and/or hydrophone streamer equipment for the purpose of keeping the trailing member at a specified depth within a water body. Earlier attempts at depth-keeping were carried out with some degree of effectiveness by simply weighting the cable or streamer or by a combination of streamer weighting plus inclusion of low gravity fluid such as light oil having a specific gravity less than that of sea water. Still other forms of paravane have been employed and these generally take the form of the classic end-connected paravane which simply produces a pre-determined directional drag on the cable or streamer, but which had little or no regulatory capability.

A prior art teaching which particularly exemplifies the present form of apparatus is disclosed in U.S. Pat. No. 3,375,800 in the name of Cole et al. as assigned to the present assignee. This patent teaches the basic form of depth controller device wherein the cable or streamer is rotatably directed axially therethrough, and there is included teaching to various control mechanisms which provide the essential scheme as regards the various forms of depth-keeping by means of pressure-responsive, depth-regulating mechanisms.

SUMMARY OF THE INVENTION

The present invention contemplates a marine cable depth controller which is remotely controllable to effect both a coarse depth setting as well as continuous regulatory control about a pre-set depth. In a more limited aspect, the invention consists of pressure regulator mechanism for controlling horizontal control planes of a paravane body or depth controller, the pressure regulator mechanism having the capability of both servo-follower and regulatory functions. The regulatory mechanism includes remote control circuitry and apparatus for varying the gas pressure within a pressure chamber to that value equivalent to hydrostatic pressure for a pre-determined depth. An additional pressure regulation device then takes effect to provide continuous regulatory adjustment as to the differential between the selected gas pressure and the ambient hydrostatic pressure to maintain the seismic cable depth controller at the pre-selected depth.

Therefore it is an object of the present invention to provide a depth-keeping apparatus which is remotely controllable from a towing vessel to maintain the towed cable accurately at a selected depth.

It is also an object of the invention to provide several variations of structure which are capable of carrying out the basic functions required to effect coarse depth-setting and continuous depth regulation of a cable depth controller.

It is still further an object of the invention to provide depth-keeping apparatus which is relatively trouble free and reliable due to the simplicity and essential character of design.

Finally, it is an object of the present invention to provide a seismic cable depth-keeping apparatus which is maintained in dry, secure conditions but in sensing relationship to the ambient hydrostatic pressure at any of a plurality of selected depths.

Other objects and advantages of the invention will be evident from the following detailed description when read in conjunction with the accompanying drawings which illustrate the invention.

BRIEF DESCRIPTION OF THE DRAWINGS

FIG. 3 is a vertical sectional side view of one form of pressure regulator mechanism as constructed in accordance with the present invention;

FIG. 4 is a vertical section taken along lines 4—4 of FIG. 3;

FIG. 5 is a horizontal section taken along lines 5—5 of FIG. 3;

FIG. 6 is a schematic diagram of a first part of the control circuit utilized in the invention;

FIG. 7 is a schematic diagram of a second part of the control circuit utilized with the invention;

FIG. 10 illustrates a pressure regulator mechanism and control circuitry in still another alternative form of the invention.

DETAILED DESCRIPTION OF THE DRAWING

Figure 1:
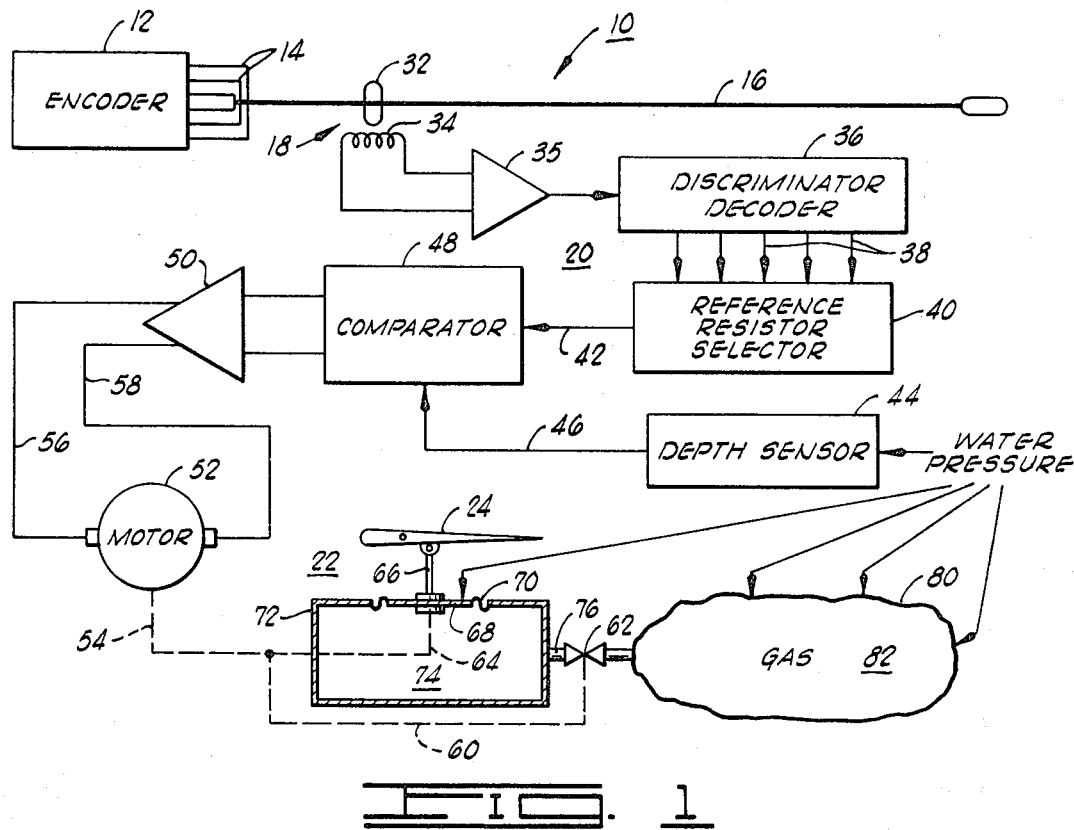
FIG. 1 is a block diagram of the depth-keeping system including the pressure sensing and regulation apparatus in pictorial block form.

Referring now to FIG. 1, a depth-keeping system 10 may consist of a transmitting encoder 12 transmitting signal energy through one or more input leads 14 for traverse along such as a marine seismic cable 16. Signal transfer is effected by a transducer 18 for input to control circuitry 20 functioning with a pressure regulator mechanism 22 to control positioning of control planes 24 to steer the depth controller in the horizontal plane.

Figure 2:
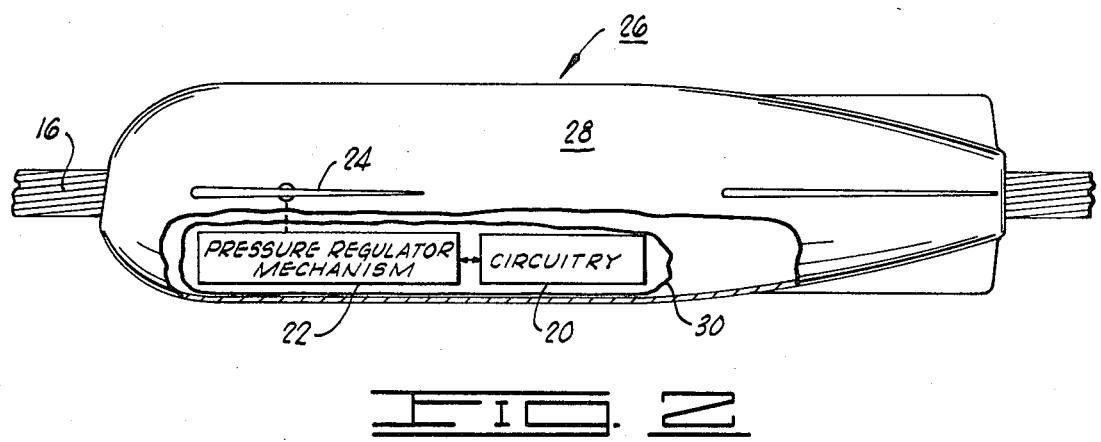
FIG. 2 is a side elevation of a marine cable depth controller showing in cutaway a block portion of the control mechanism.

As shown in FIG. 2, a depth controller 26 receives the seismic cable 16 axially therethrough, and is rotatably affixed thereto by means such as that disclosed in the aforementioned U.S. Pat. No. 3,375,800. The depth controller 26 includes the pressure regulator mechanism 22 as well as circuitry 20 as secured within the vessel housing 28 by suitable affixture. The details of the vessel housing structure and internal design are disclosed in the aforementioned U.S. Pat. No. 3,375,800. In this particular invention, a further benefit is derived by utilizing an enclosed resilient enclosure or rubber bag 30 both as a protective membrane surrounding the pressure regulator mechanism 22 and circuitry 20 as well as for a differential pressure transmitting mechanism functioning in coaction with pressure regulator mechanism 22, as will be further described below.

Referring again to FIG. 1, the encoder 12 is essentially a low frequency transmitter providing characteristic frequency output indicative of depth command for transmission along seismic cable 16. In one form of the invention, five selected frequencies are employed to enable five different depth commands. Thus, the five command frequencies may be 313 Hz-surface, 349 Hz-10 ft., 389 Hz-20 ft., 434 Hz-30 ft., and 483 Hz-40 ft; however, it should be understood that the choice and spacing of frequencies is highly arbitrary. The transducer 18 senses the transmitted signal at whatever the selected frequency for input to control circuitry 20. Signal coupling through transducer 18 is effected by means of a ringlike core material 32 surrounding the cable 16 to induce the characteristic signal through a winding 34 for input to a tone amplifier 35. The output of tone amplifier 35 is then applied through a discriminator decoder 36, a well-known form of circuitry to be further described, which is responsive to the tone of signal input to provide an output on one of leads 38. The output on one of leads 38 is then applied to a reference resistor selector 40 which enables a selected resistor in a resistance bridge network, as will be further described below, to provide a predetermined reference voltage output on lead 42 which is directly indicative of a selected depth setting.

The surrounding hydrostatic pressure is effective to actuate a depth sensor 44 to provide an output on lead 46 which is indicative of the actual or instantaneous depth of the system. The depth sensor 44 is a well-known form of resistive device which is pressure responsive. The reference output 42 and the actual depth output 46 are then applied to a comparator circuit 48 which provides differential output to a power amplifier 50. The power amplifier 50 provides drive energy to a D-C motor 52 which provides rotational output via linkage 54 to pressure regulator mechanism 22. The power amplifier 50 will provide output via leads 56 and 58, depending upon the polarity of input from comparator 48, to drive the motor 52 in one or the other direction, as required by the particular servo-follower function.

The motor 52, a geared-down D-C motor of well-known type, to be further described, provides rotational output via a linkage 54 which is utilized both to transmit a force along a linkage 60 to control valve 62, and to provide a force along a linkage 64 to provide endwise movement of a linkage 66 connected in pivotal affixture to control plane 24. The linkage 66 is connected in secure affixture to a diaphragm element 68 which, in turn, is supported by a circular, resilient diaphragm member 70 within an opening in enclosure 72. Enclosure 72 defines a pressure chamber 74, and it is in communication, for controlled variation through a conduit 76 and valve 62, to a gas supply reservoir 82 as contained within a resilient bag 80. Thus, bag 80 is allowed to remain in contact with the ambient hydrostatic pressure, while defining the gas reservoir 82. The interior of depth controller 26 is not maintained watertight, and ambient water pressure on gas bag 80 will tend to force gas from reservoir 74 through conduit 76 to chamber 74 when valve 62 is open.

FIGS. 3, 4, and 5 illustrate one form of pressure regulator mechanism as presently constructed and utilized in the field. The main body, as exemplified by the main frame 84, is contained in sealed enclosure within the rubber bag 30 with a portion of bag 30 serving as the diaphragm element 70. The main frame 84 is hollowed out with a round inner surface 86 which, in coaction with diaphragm assembly 68 and diaphragm element 70, forms the chamber 74 therewithin. An end 88 of main frame 84 includes an axial bore 90 in communication between gas reservoir 82 and chamber 74, and a poppet valve 92 is inserted in sealed relationship therein. Thus, poppet valve 92 allows controlled communication between gas reservoir 82 and chamber 74 via the passage indicated generally by dash-lines 94. The poppet valve 92 is maintained closed by a valve element 96 (FIG. 5) suitably retained to maintain locking engagement with a valve stem 98. A resilient compound tab having arms 100 and 101 bears between stem 98 and a suitable form of roller 102 extending from a valve actuator arm 104. A notched plate 105 extends from arm 104 for locking contact with a tab 107 integrally connected with element 96. The roller 102 may be formed from relatively resilient material such as nylon or teflon and threadedly secured on a screw 106 which, in turn, is secured upwardly through valve actuator arm 104. The poppet valve 92 is a commercially available type of well-known design as may be obtained, for example, from the Clippart Corporation of Cincinnati, Ohio.

At an opposite end 108 of main frame 84, an end block 110 is securely and sealing received within an end bore 112 of main frame 84. The end block 110 provides secure seating for the D-C motor assembly 52 which provides rotational input via a shaft 114 through a suitable bearing element 116 into secure affixture with an actuating cam 118. The actuating cam 118 includes an eccentric actuating post 120 and it is sealingly set against bearing assembly 116 so that a pressure-tight seal is formed between the motor compartment 122 formed within motor housing 125 and the interior chamber 74. The motor assembly 52 includes a well known type of gear motor which produces low and even fractional RPM output in response to D-C energization. One form of motor which is suitable is the Globe type No. 43A108-4.

A diaphragm actuating assembly 126 is disposed within chamber 74 extending from actuating contact with actuator post 120 to a diaphragm post 128 which extends in rigid affixture down through diaphragm assembly 68. The diaphragm actuator assembly 126 includes a pair of parallel-disposed side plates 130 and 132 which are pivotally affixed by means of a pivot pin 134 to opposite sides of diaphragm post 128. These side posts 130 and 132 extend toward motor shaft 114 to support upper and lower parallel-disposed actuator bars 136 and 138 which are situated for interfering relationship to rotation of eccentric actuating post 120. Such interference then provides pivotal movement of side posts 130 and 132 as they are pivotally affixed by means of a securing pin 140 through opposite sides of a securing bracket 142.

An extension of valve actuator arm 104 extends toward the actuating cam 118. Thus, a right angle bracket 144 is secured to the top of valve actuator arm 104 with further affixture as by screws to a block 146. The other side of block 146 is then secured to a right angle bracket 148 which includes an extension formed as a vertical actuating arm 150. The actuating arm 150 is disposed adjacent the eccentric post 120 to be laterally actuated thereby. The block 146, and therefore the remaining bracketed portions of latching arm 104, are pivotally affixed about a vertical pivot pin 152 which is secured through securing bracket 142.

Referring more particularly to diaphragm assembly 68, the diaphragm post 128 is rigidly secured through a sealing plate 154, a hole formed within resilient bag 30, and a central hole 156 through a diaphragm plate 158. Secure and sealed positioning may be assured by the use of such as an epoxy resin cementing the various adjacent elements. A screw 160 is then threadedly secured in an upper portion 162 of diaphragm post 128 thereby to affix a right angle bracket 164.

In further defining structure of the linkage 66, a double-hinged plastic element 166 is rigidly affixed to bracket 164. The double-hinge element 166 has a pair of parallel fold margins 168 and 170, and its opposite end portion 172 is then rigidly secured in a right angle bracket 174 which, in turn, is secured as by bolt fasteners or the like to a positioning frame 176 supported from main frame 84. A ring frame 178 is secured around inner surface 86 of main frame 84 to provide a clamping joinder to press the circumferential areas of diaphragm element 70 (bag 30) to main frame 84 in sealing relationship. The positioning frame 176 is then securely fastened to an upper surface of ring frame 178.

The positioning frame 176 actually supports the control planes 24 (FIG. 1) as they are secured to a support plate 179 which, in turn, is fastened to the center plane 180 of double-hinge element 166 by suitable fastening technique. The support plate 179 extends outboard in the lateral direction by an amount sufficient to provide secure fastening to the respective control planes 24.

A securing eye 182 is also secured across center portion 180 of double-hinge element 166 to provide a securing position for a spring 184. The spring 184 is a tension-type spring which is further stressed by doubling over in its mounted connection. That is, the remaining end of spring 184 is connected to a suitable securing bracket 186, optimally fastened within the inner housing of the depth controller 26, so that spring 184 is maintained in a semi-circular attitude or bend. Thus, spring 184 provides a bias force which will tend to maintain support plate 178 in its horizontal planar position while also eliminating hysteresis and deadband within the control zone of movement.

FIGS. 6 and 7 illustrate the various parts of control circuitry 20 in greater detail. Thus, remotely enabled command signals are transmitted via seismic cable 16 for pick-up through transistor 18, i.e. toroidal core 32 and induction winding or coil 34, whereupon the command signal is applied to the input tone amplifier 35. The actual control circuitry 20 is shown within dash-lines 200 and is situated on-board the depth controller 26 as securely retained within space of reservoir 82 in resilient bag 80 (FIG. 3).

Command input from coil 34 is applied to tone amplifier 35, which may be such as a two-stage transistor amplifier operating class A in well-known manner. It may also be desirable to utilize field effect transistors in amplifier 35 to enable high input impedance and high voltage gain at low supply current. The output from amplifier 35 is then applied via lead 202 to further class C amplifier circuitry consisting of NPN-type transistors 204 and 206 connected in series. Transistors 204 and 206 are connected common-emitter to intermediate voltage supply lead 208 from the mid-connection of series-connected supply batteries 210 and 212 (FIG. 7). The batteries 210 and 212 may be such as Eveready type 6-BHIT, 7.5 volt cells.

The collector of transistor 204 is connected to a positive voltage supply lead 214 which is connected through a mercury switch 216 (FIG. 7) to battery supply 210 and, similarly, an additional negative voltage supply lead 218 is connected through a mercury switch 220 to the negative terminal of power supply battery 212. The mercury switches 216 and 218 serve to disable potential application when the depth controller is turned past greater than a present lateral angle of role, e.g. when inverted for storage or shipment.

The transistor 206 also has its collector connected through a relay coil 220 of a resonant reed relay 222 to the positive voltage supply lead 214. Thus, on conduction of transistor 206, relay coil 220 is energized to selectively close one of relay contacts 224, 226, 228, 230 or 232. The resonant reed relay 222 may be such as the commercially available type known as Bramco model No. RD58. The resonant reed relay is characterized by the fact that it will provide but a single relay contact closure in really contact closure in accordance with the frequency of energizing signal. While the schematic diagram illustrates a five output resonant reed relay 22, it is entirely a matter of choice as to the number of channels of command utilized and, therefore, the type of resonant reed relay employed.

Each of relay contacts 224 through 232 is selectively energized to apply reference voltage from supply lead 208 as adjusted through a resistor 234 to the selected one of resistor networks 236, 238, 240, 242 or 244. Each of resistor networks 238 through 244 is constructed in the manner as shown for resistor network 236. That is, each consists of a series interconnection of resistors 246 and a semi-conductive controlled rectifier or SCR 248 with common output provided via a lead 250 to a pressure sensitive potentiometer 252 mounted for response to instantaneous hydrostatic pressure of the surrounds. Each of the resistors 246 within respective resistor networks 236 through 244 is selected to be a distinct and different value so that each is capable of producing a null voltage at a different, successively greater depth, as will be further described below. A particular resistor 246, and therefore a particular desired depth, is selected by triggering of the SCR 248 in series therewith.

The pressure-responsive potentiometer 252 is connected as a voltage divider in series with a fixed resistor 254 and a lead 256 through the normally closed position of relay contacts 258 to reference voltage supply lead 208. A null or zero output is obtained at the wiper terminal of potentiometer 252 when the depth controller is at proper depth and electrical balance is achieved.

Sense output from the voltage divider combination is taken via wiper element of pressure potentiometer 252 on a lead 260 for input to each of a pair of operational amplifiers, a "climb" amplifier 262 and a "dive" amplifier 264. The operational amplifiers 262 and 264 may be a commercially available type such as the National Semiconductor model No. LM201. A pair of diodes 266 and 268 provide zero clamping for respective positive and negative feed back inputs. Remaining inputs to each of operational amplifiers 262 and 264 are provided by respective resistor networks 270 and 272 which provide voltage clamping through connection to lead 274, relay contacts 276 and eventual return to supply lead 208. A diode 278 from each of resistor networks 236 through 244 provides further return to stabilize the reference voltage as applied across the respective fixed resistances of resistance networks 236 through 244 and the pressure potentiometer 252.

Thus, a known output on lead 260 from pressure potentiometer 252 will result in zero output from each of operational amplifiers 262 and 264. When the pressure potentiometer 252 is below the desired depth, the analog signal output on lead 260 will be negative and this will cause the operational amplifier 262 to go positive. As operational amplifier 262 starts to go positive, the respective feedback circuitry or resistance network 270 will cause the amplifier output to switch with snap-action from zero to maximum positive voltage no matter how slowly the input voltage may change.

In the alternative, when the pressure potentiometer 252 indicates above the desired depth, the analog output signal on lead 260 is positive. When the signal on lead 260 goes positive, the "dive" operational amplifier 264 output switches to maximum negative voltage. In this case, a positive feedback is used for the same reason as before, i.e. as the input begins to go positive, a slight amount of positive or regenerative feedback will cause the amplifier output to switch with snap-action from zero to maximum negative voltage. The action of the operational amplifier 264 is opposite to that of operational amplifier 262 and, in event of energization of either, outputs are provided via respective output leads 280 and 282 to the motor control circuitry.

The output from operational amplifier 262 is applied via lead 280 to the base of an NPN-type transistor 284 which combines with a PNP transistor 286 to form a flip-flop circuit. The collector of transistor 284 is connected through a relay coil 288 to voltage supply lead 214 such that relay coil 288 energizes upon conduction of flip-flop transistor stage 284. A de-spiking diode 290 is connected across relay coil 288. Energization of relay coil 288 will close relay contacts 292 and 294 (as shown) to provide pretermined energization of a D-C motor 296 within motor assembly 52. Relay contacts 292 and 294 receive energizing voltage from the positive supply voltage lead 214, and deenergization of relay coil 288 and, therefore, reversal of contact positions of relay contact 292 and 294 will result in opposite energization of motor 296.

Positive going voltage on "climb" input lead 280 is also present through a resistor network 298 and a lead 300 to the gate electrode on an SCR 302 thereby to trigger the SCR into conduction enabling a return circuit for motor energization. The cathode of SCR 302 is conducted through the normally-closed positions of each of a "climb" microswitch 304 and a "dive" microswitch 306 for return via negative supply lead 218 to the negative input of battery 212. Microswitches 304 and 306 are integrally contained within motor assembly 52, and each is actuated when the motor 296 is rotated to its opposite rotational extremes indicating "climb" limit and "dive" limit directions, respectively. In their opposite actuations, "climb" microswitch 304 provides connection from negative supply lead 218 to a resistor 308 and diode 310 for conduction via lead 312 to the base of NPN transistor 284 thereby to cut off transistor conduction and revert the flip-flop action. The microswitch 306 provides the similar action in the "dive" condition in that it is actuated to conduct the negative voltage from lead 218 to a lead 314 and through a resistor 216 to the base of PNP transistor 286, as connected common-collector between intermediate supply lead 208 and the positive supply lead 214.

An SCR 320 is connected in parallel with SCR 302, to be energized through a microswitch 322 when triggered via gate electrode connection to lead 324 which connects back through a capacitor 326 and resistor 328 to the collector of flip-flop transistor 284. The "stop" microswitch 322 is shown in the normal position wherein the depth controller is in its controlling or fine regulation mode. Operation of the "stop" microswitch 322 is effected at the central rotational position of motor 296 to turn off the SCR 320 which, in turn, controls de-energization of motor 296.

A PNP transistor 330 provides the function of power control. Transistor 330 is connected common collector with the collector energized through a load resistor 332 to negative supply lead 218, while the emitter is coupled to lead 202 which is connected to positive supply lead 214. The base of transistor 330 is clamped at a pre-set voltage from positive supply lead 214, and it is further connected through a diode 334 and current limiting resistor 336 to the normally-open contact of "stop" microswitch 322. Thus, power control transistor 330 is enabled by closure of stop microswitch 322 whenever the depth controller is not in the neutral or controlling mode position.

A lead 338 from the collector of transistor 330 is supplied back to a relay control transistor, an NPN transistor 340. The transistor 340 provides control of energization of a relay 342 which enables conservation of battery power when the depth changing portion of the circuitry is not in use. Thus, when the depth changing circuitry is not used, signal output on lead 338 transistor 330 causes transistor 340 to conduct to energize relay coil 342 such that relay contacts 258 and 276 actuate to switch off the pressure potentiometer/voltage divider circuitry and operational amplifiers 262 and 264. In addition to the control signal from the collector of the power control transistor 330, the relay control transistor 340 may be energized by command signal output from any one of the five resistor networks 236 and 244.

Upon a "dive" command, the operational amplifier 264 will provide a negative output on lead 282 for input to a PNP-type transistor 344 to cause conduction in transistor 344 such that its collector potential goes from the negative supply voltage to zero. A positive pulse is conducted from the collector of transistor 344 through lead 300 to the gate electrode of SCR 302 to cause conduction therethrough. Since the flip-flop circuit of transistors 284 and 286 is in the "off" state, relay coil 288 is not energized and the motor runs in its reverse direction to move rotationally toward the "-dive" lock position. When the position is reached, the "dive" lock position. When the position is reached, the "dive" microswitch 306 operates to turn off SCR 302 and motor 296. The "dive" microswitch 306, when actuated, applies a negative bias via lead 314 to the base of transistor 286 which turns off the flip-flop transistor combination and energizes relay coil 288. Thereafter, when the desired depth is attained, the dive output from operational amplifier 264 switches from the negative voltage to zero thereby to transmit a positive pulse through a resistor 350 and capacitor 352 via lead 324 to the gate electrode of SCR 320. Motor 296 therefore runs forward until the stop microswitch 322 actuates, this indicating that the fins are back in the controlling mode, and the actuation turns off SCR 320 and motor 296. As previously stated, this actuation also connects negative bias to the base of transistor 284 to de-energize the relay 288.

OPERATION OF THE PREFERRED EMBODIMENT

The depth keeping system of the present invention utilizes both a servo control function for coarse depth-keeping and a regulatory function for fine control at the selected depths. Thus, remote selection at encoder 12, i.e. one of the specified C-W signals, is transmitted along the seismic cable 16 for pick up through transducer 18 with subsequent amplification in tone amplifier 35 and application to discriminator decoder 36. This selected frequency signal exercises control over a servo-follower function which will bring the depth controller 26 to a selected coarse depth whereupon the servo-follower circuitry and mechanism is disabled with the control planes 24 in generally horizontal attitude. Thereafter, at that prescribed depth, the regulatory mechanism consisting of diaphragm assembly 68 and pressure chamber 74 will tend to keep the depth controller 26 at the selected depth.

With more particular reference to FIGS. 3 through 7, and other references as noted, the selected frequency command signal is applied through tone amplifier 35 and class C transistor amplifier stages 204 and 206 to the resonant reed relay 222. In accordance with frequency, one of contacts 224 through 232 is closed to connect a selected resistance network 236 through 244 in series with the depth sensor or pressure potentiometer 252. Only when the depth controller 26 comes to the depth of the selected resistance network 236 through 244 will there be a null output on lead 260 from pressure potentiometer 252. In any other event, depending on whether the next selected depth is above or below the present cruising depth, one or the other of operational amplifiers 262 or 264 will be energized. For example, when the command signal requires the depth controller 26 to ascend in the water, the operational amplifier 262 is energized by an output via lead 280 to energize flip-flop transistors 284–286 thereby energizing relay 388. At the same time, the operational amplifier output on lead 280 is applied via lead 300 to trigger SCR 302 which enables motor voltage to be applied through relay contacts 292 and 294 to the drive motor 296 within motor assembly 52.

Referring now to FIG. 3, the motor 296 is energized to rotate shaft 114 and, therefore, actuating post 120 such that it comes into contact with the lower actuating bar 38 to pivot side posts 130 and 132 about the fulcral securing pin 140 thereby to bear upward against pivot pin 134 to move the diaphragm assembly 168 upward. This action results in a lessened total pressure within pressure chamber 74, even less than the surrounding hydrostatic pressure at the new depth; however, cam action of actuating pin 120 also provides lateral movement of right angle bracket 148 to swing the actuator arm 104 and roller 102 sideways thereby to release tab 107 of element 96 to unlock stem 98 of the poppet valve 92. The poppet valve 92 is then opened by compressed tab 101 acting on valve stem 98 to allow communication of gas at unequal pressure as between reservoir 82 and the pressure chamber 74 thereby to equalize the total internal pressure with the surrounding hydrostatic pressure.

To restate, with the controller on depth and the valve stem 98 extended in closed position, and latched by element 96, the spring arms 100 and 101 will be compressed between the end of valve stem 98 and roller 102. This exerts a force against valve stem 98 tending toward valve open position but it is prevented from such actuation by latching engagement of element 96. When motor 52 responds to a command signal, initial lateral movement of link 104 moves tab 107 of element 96 to unlock valve stem 96. The roller 102 remains on the dwell portion of compressed spring tab 100 which forces valve stem 98 inward to open, and this insures opening before diaphragm 70 can move to all pressure equalization.

Only slight further movement of link 104 is required to move element 96 via the rigid plate 105 to the valve-open latch position. Continued movement of link 104 removes roller 102 from contact with spring 100 thereby removing external force from the stem of valve 92 so that the internal release spring can force the valve 92 closed when element 96 is next moved in the locking direction by return of rigid tab 107. Thus, the diaphragm 70 is forced to move under power of motor 52 only during that position of the stroke of link 104 which is removing spring force from the stem of valve 92, i.e. after the valve is latched open.

When an assigned depth is reached and the motor 52 is energized to rotate to the mid-position, the initial movement of link 104 forces element 96 to its unlatched position and before roller 102 has compressed spring tabs 100 and 101. Slight further movement of link 104 moves element 96 to the valve-closed latching position; and, continued movement brings roller 102 into contact to compress spring tabs 100 and 101 thereby resetting standby conditions.

After the depth controller 26 comes to its newly selected depth, potentiometer 252 provides a null output and each of climb and dive operational amplifiers 262 and 264 provide their zero outputs such that motor 296 is allowed to reverse to drive the diving planes to their neutral position. That is, when the motor shaft 114 rotates to enter the "climb" or "dive" lock position or rotational extreme, the respective "climb" or "-dive" microswitch 304 or 306 operates to turn off SCR 302 and the motor 296. This sequence also de-energizes the flip-flop transistors 284 and 286 so that relay 288 is de-energized. De-energization of relay 288 enables reverse energization of motor 296 so that the motor runs in the opposite rotation until the stop microswitch 322 is actuated to indicate that the control planes 24 are back in a controlling or regulatory mode. Operation of the stop microswitch 322 also turns off SCR 320 and the motor 296 to place the circuitry in the stand-by or quiescent operation.

When the motor has returned to its central rotation or stop position, the diaphragm assembly 68 is allowed to remain as suspended between outside hydrostatic pressure and the now-equalized internal pressure of pressure chamber 74. The poppet valve 92 is once again closed so that the hydrostatic pressure for the selected depth as retained within pressure chamber 74 will remain constant. Thereafter, the depth controller 26 is maneuvered in its fine control or regulatory mode simply by driving the control planes 24, as connected to support plate 179, through vertical movement of diaphragm assembly 68 in response to differential pressure variations as between the internal pressure of pressure chamber 74 and the external hydrostatic pressure. The bias spring 184 acts cooperatively with external water pressure to require that the gas pressure within chamber 74 be greater than the external water pressure through the control zone of diaphragm movement. This insures that diaphragm 70 convolutes outward and can not flop within the saturation limits of the controller.

Ensuing selections to different depths, as made from the remote position take place in the same manner. Thus, sequence also de-energizes the flip-flop transistors 284 and 286 so that relay 288 is de-energized. De-energization of relay 288 enables reverse energization of motor 296 so that the motor runs in the opposite rotation until the stop microswitch 322 is actuated to indicate that the control planes 24 are back in a controlling or regulatory mode. Operation of the stop microswitch 322 also turns off SCR 320 and the motor 296 to place the circuitry in the stand-by or quiescent operation.

When the motor has returned to its central rotation or stop position, the diaphragm assembly 68 is allowed to remain as suspended between outside hydrostatic pressure and the now-equalized internal pressure of pressure chamber 74. The poppet valve 92 is once again closed so that the hydrostatic pressure for the selected depth as retained within pressure chamber 74 will remain constant. Thereafter, the depth controller 26 is maneuvered in its fine control or regulatory mode simply by driving the control planes 24, as connected to support plate 179, through vertical movement of diaphragm assembly 68 in response to differential pressure variations as between the internal pressure of pressure chamber 74 and the external hydrostatic pressure. The bias spring 184 acts cooperatively with external water pressure to require that the gas pressure within chamber 74 be greater than the external water pressure through the control zone of diaphragm movement. This insures that diaphragm 70 convolutes outward and can not flop within the saturation limits of the controller.

Ensuing selections to different depths, as made from the remote position take place in the same manner. Thus, in accordance with whether the depth controller 26 is to be raised or lowered to a new level, motor assembly 52 is driven in one or the other rotations to drive diaphragm assembly 68 such that the diving planes are turned to ascent or descent. Simultaneously, the poppet valve 92 is opened to allow pressure communication between the reserve pressure reservoir 82 and the pressure chamber 74 so that it will seek a new internal pressure equal to the hydrostatic pressure at the selected depth. After the depth controller is brought to the newly selected depth, poppet valve 92 is again closed and diaphragm assembly 68 remains vertically moveable in its regulatory mode to effect correcting planar tilts of the control plan support plate 179 in response to pressure variations about the selected hydrostatic pressure.

Figure 8:
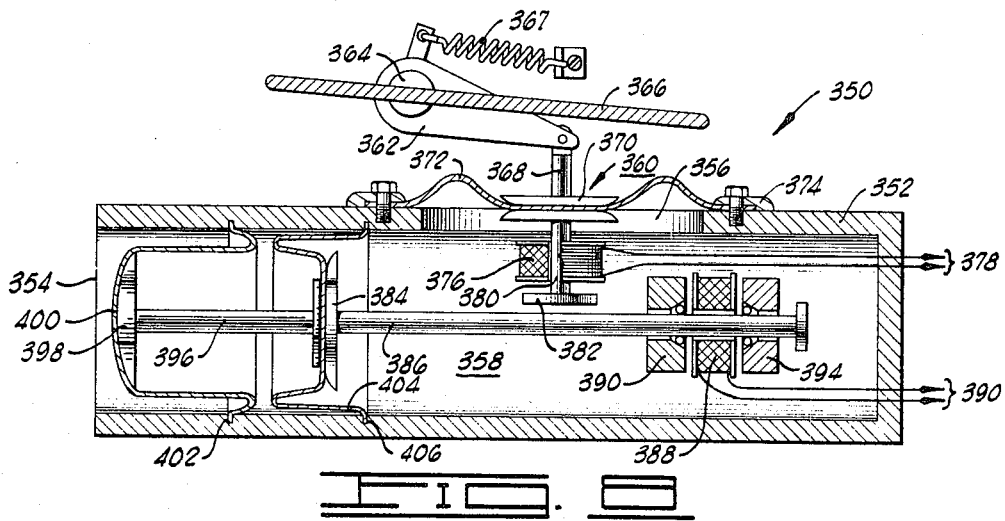
FIG. 8 is a vertical, sectional side view of an alternative form of device which may be built utilizing teachings of the present invention.
Figure 9:
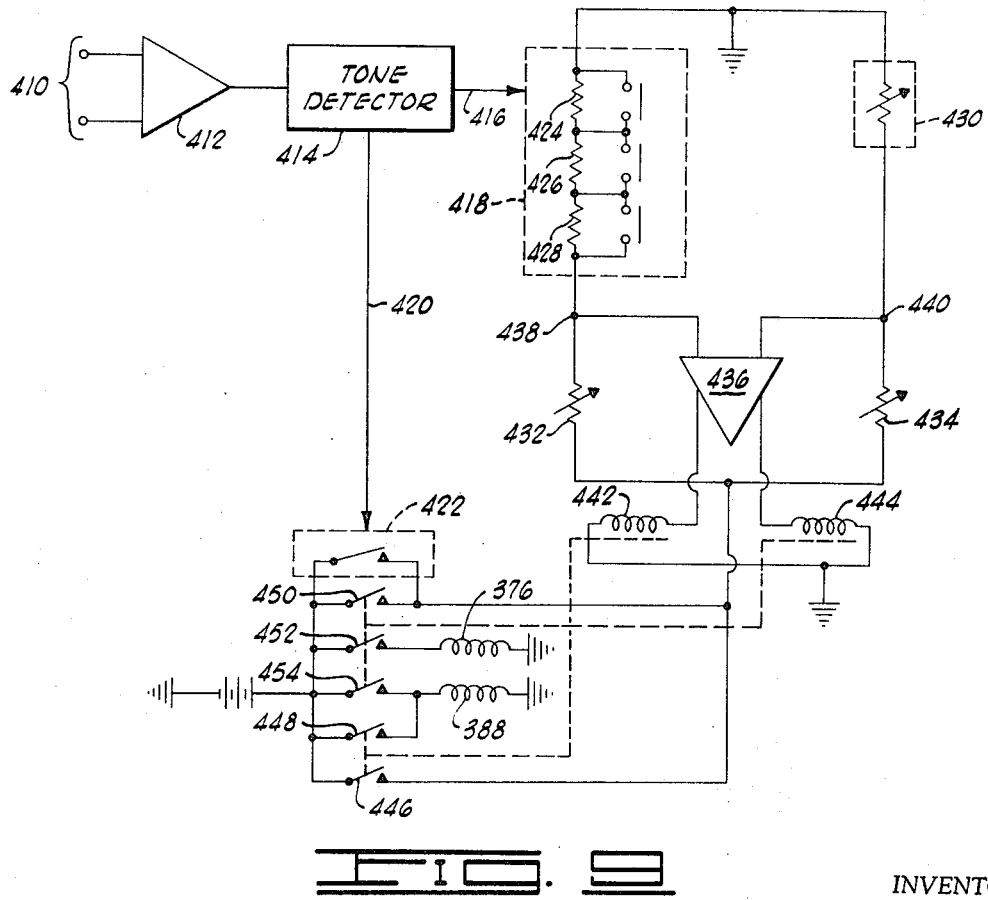
FIG. 9 is a block diagram of control circuitry for use with such as the alternative form of mechanism in FIG. 8.

ALTERNATIVE INVENTION OF FIGS. 8 and 9

FIGS. 8 and 9 disclose an alternative and somewhat simplified form of the basic invention. A pressure regulator mechanism 350 is shown as being comprised of a main housing 352 having an open end 354 for communication with surrounding hydrostatic pressure. The main housing 352 includes a generally circular aperture 356 in communication with an internal pressure chamber 358, aperture 356 being covered by a vertically moveable diaphragm assembly 360 which is pivotally connected to a turn linkage 362 as secured to a transverse shaft 364 which transmits angular rotation to depth control planes 366.

The diaphragm assembly 360 consists of a shaft 368 secured through a clamping portion 370 which is sealingly clamped through a resilient diaphragm 372 that, in turn, is sealingly connected about the aperture 356 on the upper side of main housing 352 by means of a clamping ring 374. The lower portion of shaft 368 extends through a descent initiating coil 376 suitably secured within said main housing 358 in operative relationship to shaft 368. A pair of energizing leads 378 are then lead out from pressure chamber 358 for suitable energizing connection at related control circuitry within the depth controller. Energization of the descent initiating coil 376 will tend to draw shaft 368 and a lower core portion 380 upward until retained by stop 382 to impart counterclockwise rotation to linkage 362 in rotation of shaft 364 to impart descending angle to control planes 366.

Pressure within pressure chamber 358 is varied in accordance with the surrounding hydrostatic pressure through the action of a piston 384 as displaced by a piston rod 386 which is controlled by an electrically controlled clamp, i.e. unclamping coil 382 as energized by leads 390 and clamp mechanism 392 and 394 operating in concert. The piston 384 may be such as an especially designed differential pressure barrier which includes a rod extension 396 and former 398 functioning with a first resilient sealing membrane 400 which is sealingly connected about the interior of main housing 352 at internal periphery 402, as by suitable fastening means. Similarly, a second resilient sealing membrane 404, circumferentially sealed as at 406, extends across the interior of main housing 352 adjacent piston 384 to form an interface adjacent the pressure chamber 358. Energization of unclamping coil 388 frees piston 386 for longitudinal movement therethrough so that piston 384 seeks a balance as between the external hydrostatic pressure and that pressure which is present in pressure chamber 358.

Referring now to FIG. 9, the control circuit is similar to that which is specifically described in FIGS. 6 and 7. Thus, control input is applied at inputs 410 through a suitable amplifier 412 to tone detector 414. Outputs from tone detector 414 provide a signal on lead 416 to a series reference resistor network 418, as well as a signal on lead 420 a mode switch 422. The reference resistor network 418 serves to select a pre-determined resistance, as selected in accordance with command input, by actuating a by-passing of one or more of the series resistors 424,426,428.

The resistor network 418 is connected in circuit as part of a bridge network, reference resistors 418 being connected in balance with a pressure-responsive potentiometer 430 which is maintained in contact with external hydrostatic pressure. A pair of calibrating resistances 432 and 434 complete the bridge connection with a differential amplifier 436 being connected between opposite bridge junction points 438 and 440. Voltage unbalance as between junction points 438 and 440 is then sensed and amplified in differential amplifier 436 whereupon one or the other of an ascent relay 442 or a descent relay 444 is energized, according to the sense of the output from amplifier 436. The ascent relay 442 controls relay contacts 446 which applies positive D-C potential to the bridge circuit, and it also controls relay contacts 448 which energize unclamping coil 376. The descent coil 444 controls closure of relay contacts 450 which applies D-C potential to the bridge circuit, relay contacts 452 which control energization of the descent initiation coil 376, and relay contacts 454 which energize the unclamping coil 388. Mode switch 422 is closed by signals from tone detector 414 to enable D-C potential application to the bridge circuit whenever any command signal is received through tone detector 414.

In operation, the individual resistors 424, 426 and 428, which in combination constitute reference resistor network 418, may be selected to have resistance values in binary sequence; that is, each value of resistance is double the value of the next lowest resistance, and if each signal frequency which can be transmitted to and received by the tone detector 414 is made to leave one particular value of resistance in the bridge circuit, then the combination of three resistors and three tones is such that a total of seven pre-determined depths will be available to assign to the controller. It is assumed that the controller has been running at a particular depth and that, for purposes of operational explanation, the controller will be placed at a new depth below the present running depth. Thus, one or more tones are transmitted corresponding to the binary setting which is desired.

Upon receipt by tone detector 414, one or more of resistors 424 through 428 are placed in circuit and the mode switch 422 is closed to place D-C potential on the bridge circuit. Since the controller is presently at a higher elevation than the newly selected depth, the resistance of pressure potentiometer 430 will not be sufficient to balance the bridge circuit, and an anti-null signal will appear at the input to differential amplifier 436. The output from amplifier 436 will then actuate descent relay 444 to close the relay contacts 450, 452 and 454. Closure of the relay contacts maintains D-C potential on the bridge circuit while energizing both the descent coil 376 and the unclamping coil 388, and the circuit will remain in this state until the descent of the depth controller brings it to the pre-selected depth at which the pressure potentiometer 430 will again produce a null input to differential amplifier 436.

Upon production of the null, the descent function relay 444 drops out of energization to open its respective contacts and to de-energize the bridge circuit. The mechanism has then fulfilled its servo-follower or control mode and is then placed in the regulatory mode of operation. That is, pressure within pressure chamber 358 is properly balanced as opposed to external hydrostatic pressure such that minute variations in depth controlling position are corrected through movement of diaphragm assembly 360 to cause correctional variations of control planes 366.

When D-C potential is applied across descent coil 444, the magnetic force urges shaft 368 in the upward direction placing the control planes 366 in a descending attitude. The application of D-C potential to the unclamped coil 388 causes release of the clamping mechanisms 390 and 394 so that the piston 384 and rod 386 become freely moveable to seek their own positions as balanced between the internal pressure within pressure chamber 358 and the external hydrostatic pressure. Inward movement of piston 384 maintains internal gas pressure equal to the external outer pressure. When the controller reaches proper depth and assumes its regulatory mode, the clamps 390 and 394 lock the piston rod 386 in its newly assumed position. Since the internal gas pressure is now equal to external outer pressure, the bias spring 367 will move the control planes 366 to an ascending position until the external water pressure diminishes by the magnitude of the bias spring force divided by the area of primary diaphragm 372. The vertical movement represented by this pressure reduction will typically be but a few inches and negligible in total.

ALTERNATIVE FORM OF FIG. 10

FIG. 10 disclosed still another variation on the basic design which includes capability of a control mode and a regulatory mode of operation. A pressure regulator mechanism 460 consists of an expansion chamber 462 which is in communication with surrounding hydrostatic pressure and which is connected by means of a sealed conduit 464 and solenoid-controlled valve 466 to a main frame 468. The main frame 468 defines a pressure chamber 470, and is integrally constructed with a diaphragm assembly 472 which forms an interface with the ambient hydrostatic pressure surrounds. The diaphragm 472 connects through a pivotal linkage 474 and shaft 476 to drive guide planes 478 as biased upward by means of bias spring 480 suitably fastened within the associated depth controller structure.

The diaphragm assembly 472 consists of a diaphragm plate 482 which receives resilient membrane or diaphragm 484 in sealed relationship about the periphery by suitable fasteners. The interior portions of diaphragm 484 are fixed within clamping plates 486 as secured along a piston rod 488 which is pivotally secured to linkage 474. A threaded portion 490 of diaphragm plate 482 is threadedly received in sealed relationship within a collar portion 492 forming a communication with pressure chamber 470. The diaphragm piston rod 488 is received down through an axial bore 494 in collar portion 492 while allowing a remaining air passage space 496 therealong. An electrical coil 498 is suitably secured within collar portion 492 around piston rod 498 while electrical leads 500 are lead outward to the related control circuit within the depth controller. The piston rod 488 is formed of suitable core-like material such that it is responsive to electrical current flow through coil 498 to move endwise therein.

An end cap 502 is threadedly secured in sealed relationship through an end 504 of main frame 468, its purpose being to house a pressure within pressure chamber 470, electrical output being via leads 508 to control circuitry 510 which would be suitably disposed within the depth controller.

Expansion chamber 462 includes an expansible interface 512 which is sealingly connected within chamber 462 and in communication with external hydrostatic pressure via orifice 514. Thus, interface 512 is capable of expanding and contracting in volume within internal space 516 of expansion chamber 462. In turn, the internal chamber 516 transmits variations in pressure through conduit 464 to valve 466. The solenoid valve 466 can then be actuated by suitable input from control circuitry, as will be further described, to open the valve and allow pressure communication and equalization with pressure chamber 470. It is also contemplated that additional control inputs may be utilized to provide opening of the control valve 466. For example, a bottom contact lever (not shown) may be utilized to open conduit 464 and allow pressure equalization to cause emergency ascent of the depth controller.

The control circuitry of FIG. 10 is similar to that described with respect to the foregoing embodiments of the invention. The seismic cable 16 is sensed for control signal by means of a toroidal core 520 and sense winding 522 to provide input to a standard form of amplifier 524. Output from amplifier 524 is then applied through a tone detector 526 to provide an output selection of pre-scribed resistance in a resistor network 528 within a bridge circuit indicated generally as 530. The bridge circuit 530 consists of the selectable resistor network 528, pressure potentiometer 506 within pressure chamber 470, and a pair of calibrating potentiometers 532 and 534. Output from the bridge circuit is taken between leads 536 and 538 for input to a differential amplifier 540 which provides a sense output to control relay 542. The outputs from control relay 542, leads 544 and 546, are applied to control respective actuations of pressure regulator mechanism 560. Thus, output on lead 544 actuates solenoid-control valve 466 to permit pressure equalization as between internal chamber 516 and the pressure chamber 470, while output on lead 546 energizes the relay coil 498 to draw diaphragm shaft 488 upward thereby to place the planes 478 in the dive or descent position. The spring bias 480 is adjusted to sufficient force such that it carries out the ascent function, and is counter-acted merely by periodic and controlled output from control relay 542 on lead 544 to the solenoid-controlled relay 466 to effect proper pressure equalization between pressure chamber 470 and the surrounds.

The foregoing discloses novel designs for effecting accurate and reliable control of one or more cable depth controllers from a remote position or command post such as aboard a towing vessel. The apparatus of the invention is especially advantageous in that it enables both rapid coarse adjustment of operating depth through a servo control mechanism and it provides additional fine control about a selected depth by means of relatively simple and reliable mechanical structure.

Changes may be made in the combination and arrangement of elements as herefore set forth in the specification and shown in the drawing; it being understood that changes may be made in the embodiments disclosed without departing from the spirit and scope of the invention as defined in the following claims.

What is claimed is:

1. Apparatus for controlling the depth of a seismic cable depth controller assembly which includes depth adjusting control planes, comprising:

first chamber means including as an integral part of a wall thereof a diaphragm portion which is resiliently moveable to provide a pressure adjustable interface between internal chamber pressure and ambient hydrostatic pressure at said depth controller;

linkage means connected between said diaphragm portion and said control planes to provide proportional control plane angular adjustment in response to displacement of said diaphragm portion due to differential pressure across said interface;

expansible chamber means in contact with said ambient hydrostatic pressure and containing gas under nominal pressure, said expansible chamber means including valve-controlled conduit means for placing said expansible chamber means in communication with said first chamber means; and control means to drive said linkage means such that the control planes guide said depth controller to a predetermined depth and, simultaneously, to open said valve-controlled conduit means to allow pressure equalization between said expansible chamber means and said first chamber means, said control means additionally comprising:

actuation means doubly hinged for movement in two planes and responsive to said control actuation means disposed within said first chamber means in connection to drive said linkage means and to open said valve-controlled conduit means; and actuation control means energized by said control means and being disposed to transmit actuation control into said first chamber means to said actuation means.

2. Apparatus as set forth in claim 1 which is further characterized to include:

a resilient sealed bag enclosure which envelopes said first chamber means while forming said diaphragm portion of the first chamber means, said enclosure forming the expansible chamber means.

* * * * *